Aug. 15, 1967   J. E. HIERS ET AL   3,335,752
WATER CONDITIONING SYSTEM
Filed Dec. 30, 1963   3 Sheets-Sheet 1

INVENTORS
James E. Hiers,
Edward C. Grout,
BY
Byron, Hume, Groen - Clement
attys

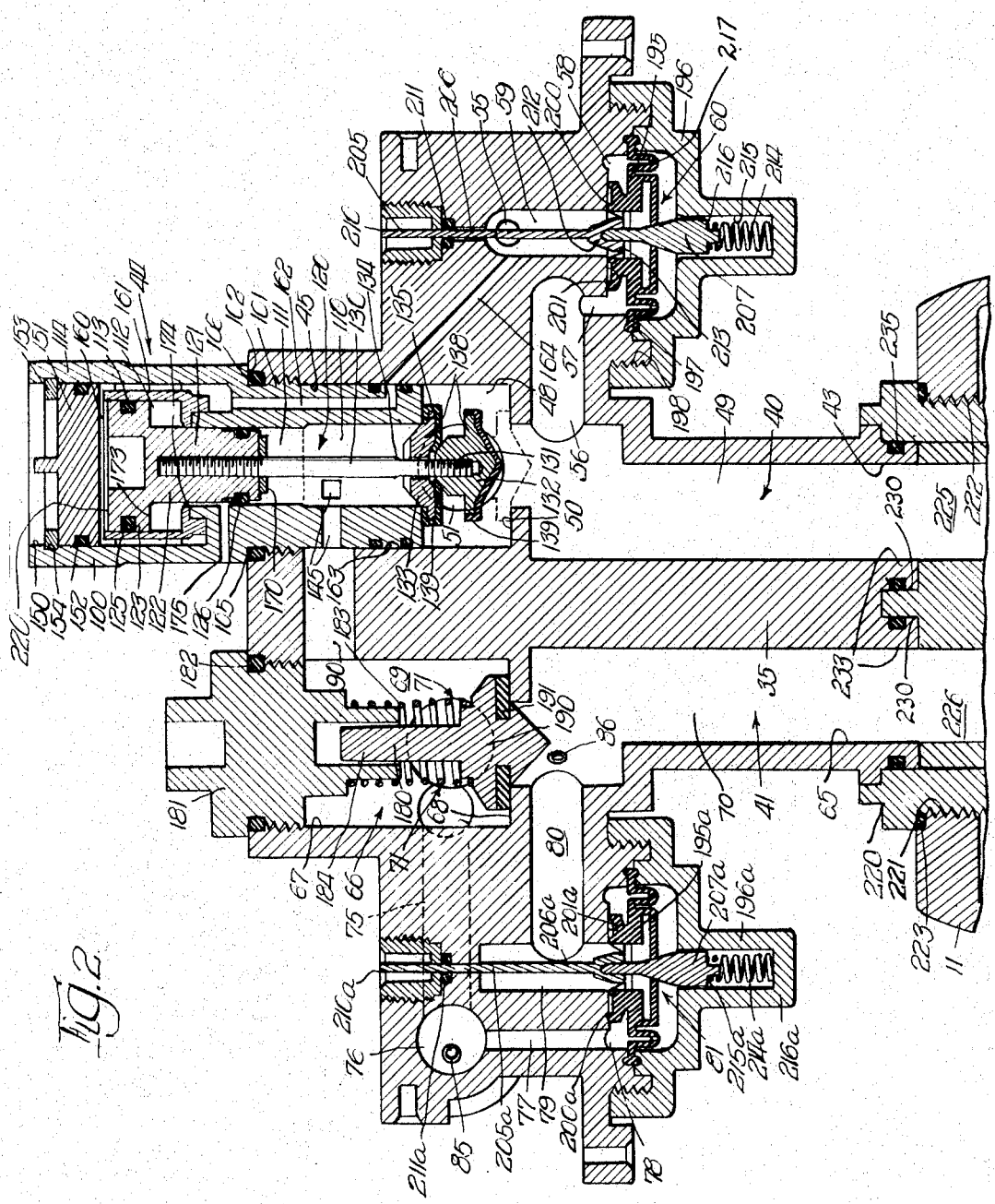

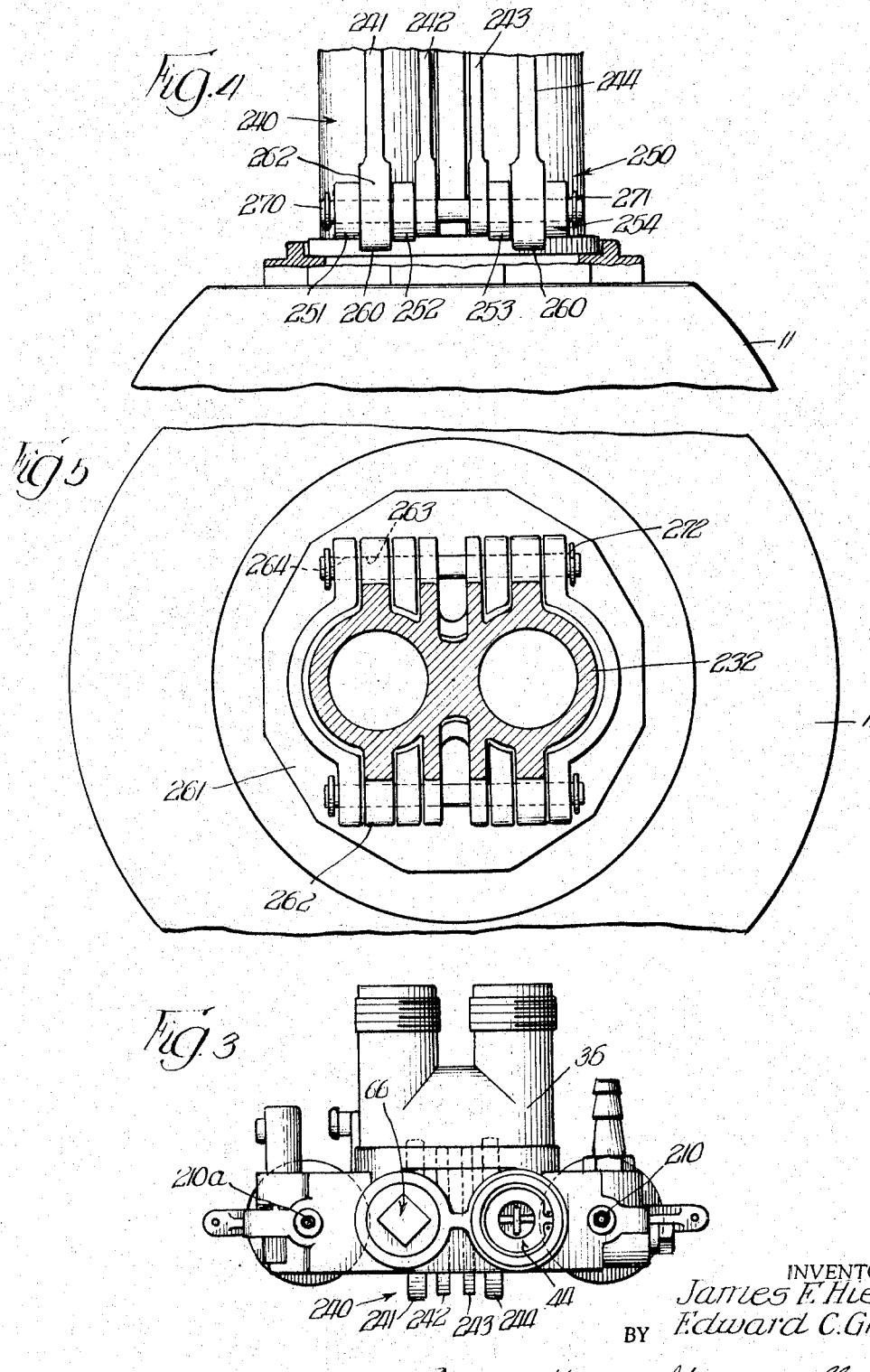

United States Patent Office 3,335,752
Patented Aug. 15, 1967

3,335,752
WATER CONDITIONING SYSTEM
James E. Hiers, St. Paul, and Edward C. Grout, White Bear Lake, Minn., assignors to Union Tank Car Company, Chicago, Ill., a corporation of New Jersey
Filed Dec. 30, 1963, Ser. No. 334,202
8 Claims. (Cl. 137—599.1)

This invention relates in general to water treatment apparatus. It deals more particularly with a valve assembly for controlling treatment operations, and a mounting arrangement therefor. The invention described herein is an improvement over that described in the co-pending application of B. H. Kryzer, Ser. No. 190,995, filed Apr. 30, 1962, now Patent No. 3,215,273, and assigned to the same assignee as the present invention.

An object of the present invention is to provide an improved multiple position valve assembly for controlling water treatment operations in a water softener or the like.

It is another object to provide a valve assembly including a new and improved two-way valve which is manipulated by fluid pressure differentials.

It is still another object to provide a valve assembly of the aforedescribed character wherein an auxiliary pressure boost is provided for positively seating the two-way valve in one position.

It is yet another object to provide a valve assembly including a new and improved mounting arrangement.

It is a further object to provide a mounting arrangement which facilitates quick and simple mounting, removal, and replacement of an entire valve assembly.

The foregoing and other objects are realized in accordance with the present invention by providing an improved valve assembly, including the mounting arrangement for controlling water treatment operations including service, regeneration, and backwash flow of water and brine, for example, in a water softener. The invention contemplates a valve assembly wherein differential fluid pressures set up by actuator valve means are effective to operate a new and improved two-way valve; and the two-way valve is positively seated in one position by the pressure-differential assisted by a pressure boost. The valve assembly mounting arrangement affords quick and simple mounting, removal, and replacement of the valve assembly from the top of a water softener tank, for example, while assuring a secure mounting during operation.

The invention, both as to its organization and method of operation, taken with further objects and advantages, will best be understood by reference to the following description taken in connection with the accompanying drawings in which:

FIGURE 2 is an enlarged sectional view of the valve assembly;

FIGURE 3 is a plan view of the valve assembly;

FIGURE 4 is an enlarged elevational view of the valve assembly mounting arrangement, with parts broken away; and FIGURE 5 is an enlarged plan view in section of a portion of the valve assembly mounting arrangement.

Figure 1:
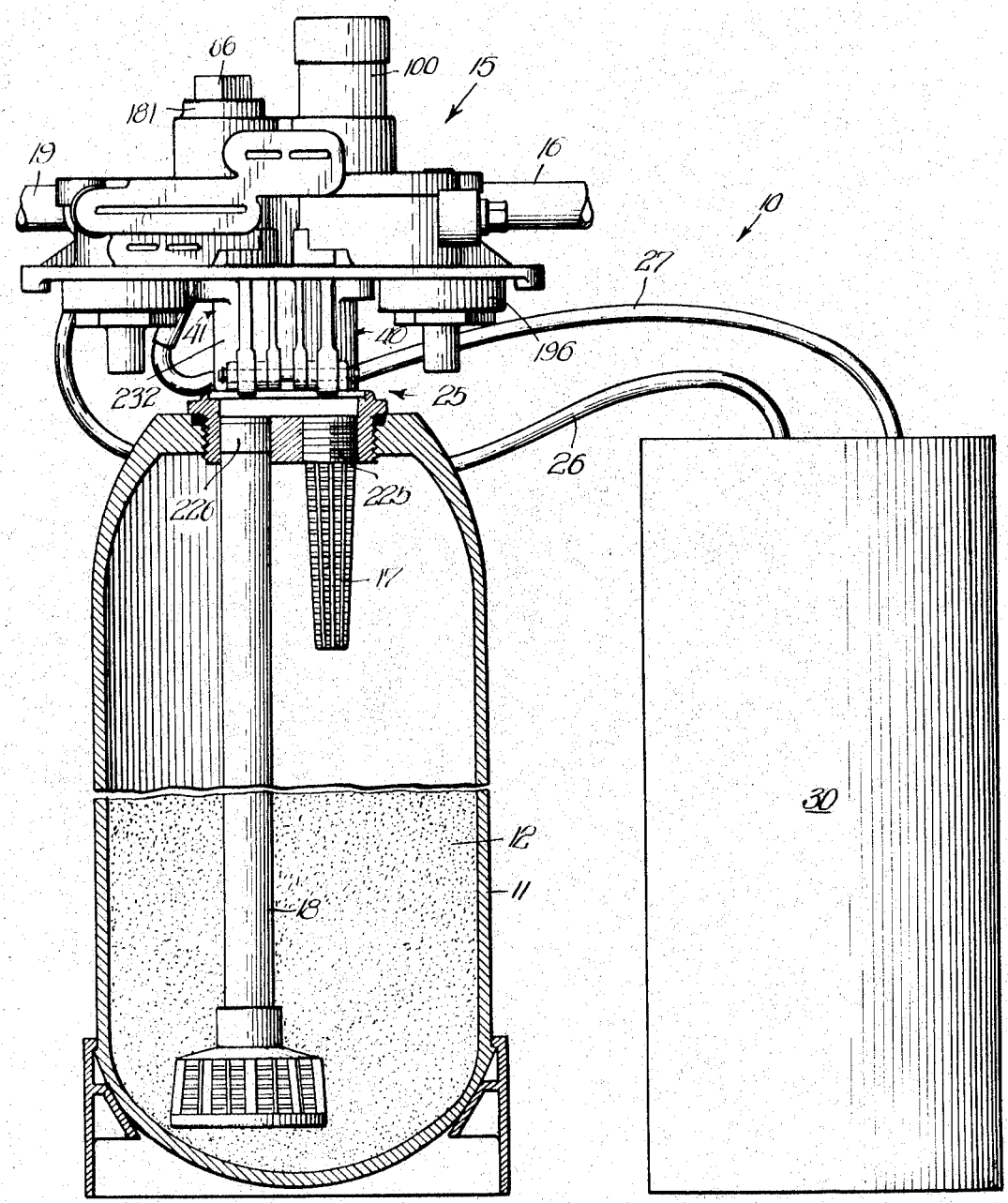
FIGURE 1 is a front elevational view of water treatment apparatus including a valve assembly and mounting arrangement embodying features of the present invention, with certain portions of the apparatus in section.

Referring now to the drawings, and particularly to FIGURE 1, a broadly conventional water treatment apparatus is illustrated generally at 10. The apparatus 10 includes a water treatment tank 11 containing particulate material 12 through which water to be treated is passed. Treatment tanks containing particulate material 12 of this type have been used for many years as filters, water softeners, and other water treatment apparatus, of course.

In normal operation of the water treatment apparatus 10, a valve assembly 15, embodying features of the present invention, directs water from the service line terminus 16, into the tank 11 through its top distributor 17, and out of the tank 11 from its bottom distributor 18, to the service line terminus 19. A mounting arrangement 25 embodying features of the present invention secures the valve assembly 15 on the treatment tank 11 for quick and simple removal and replacement. The valve assembly 15 is, in turn, connected through conduits 26 and 27 to a regenerant supply reservoir 30 which, upon demand by operation of the valve assembly 15, provides a supply of regenerating fluid for passage through the particulate material 12 within the tank 11 in a well-known manner.

As will hereinafter be discussed in more detail, the valve assembly 15 is also effective to initiate and control backwash of service water through the particulate material 12 to remove residual regeneration fluid and/or foreign material therefrom prior to re-introducing the tank 11 to service. The valve 15 is manipulated, insofar as initiation and timing of regeneration and backwash, for example, by a timing device of the type disclosed in the co-pending Hiers application entitled, Water Conditioning System, Ser. No. 285,117, filed June 3, 1963, now Patent No. 3,273,403, and assigned to the same assignee as the present invention. The timing device disclosed in the Hiers application referred to above is normally mounted on top of the valve assembly 15, and the entire arrangement enclosed by a suitable housing.

Referring now to FIGURES 2 and 3, and particularly to FIGURE 2, the valve assembly 15 embodying features of the present invention will be seen to comprise a generally T-shaped valve body 35, preferably formed of plastic or the like. The valve body 35 is retained securely, yet removably, on the top of the treatment tank 11, by the mounting arrangement 25 embodying features of the present invention.

The valve body 35 includes a pair of vertically disposed passages 40 and 41 extending entirely through it in generally parallel relationship. The passage 40 has an outlet 43 at its lower end in communication with the top distributor 17 in the tank 11 through the mounting arrangement 25. A removable two way valve 44 embodying features of the present invention seats in and seals the opposite end 45 of the passage 40.

The passage 40 is divided into an upper passage section 48 and a lower passage section 49 by the valve seat 50. The two way valve 44 is adapted to shut off communication between the upper and lower passage sections 48 and 49 according to the present invention but, as illustrated in solid lines in FIGURE 2 normally permits free communication between the passage sections during normal service operation.

The upper passage section 48 is connected with the service line terminus 16 by a raw water inlet port 51. Since the two way valve 44 normally permits communication between the upper passage section 48 and the lower passage section 49 of the passage 40, it will be seen that the service line terminus 16 is normally in communication with the top distributor 17 in the treatment tank 11. The flow of service water through the valve assembly 15 and the treatment tank 11 will be more fully discussed in the succeeding description of the use and operation of the valve assembly 15 and the treatment tank 11 will be more fully discussed in the succeeding description of the use and operation of the water treatment apparatus 10, however.

The lower passage section 49 of the passage 40 is adapted to communicate with a drain port 55 through the horizontal passage 56, the port 57, a regeneration actuator valve chamber 58, and the valve stem passage 59, as will be recognized. The valve stem passage 59 forms a "drain chamber" adjacent the drain port 55; the port 55 having a restricted opening to drain to build up pressure in the drain chamber for providing the two way valve with a pressure boost according to the present invention. Communication between the lower passage section 49 and the drain port 55 is normally closed off by the regeneration actuator valve 60, as illustrated in FIGURE 2.

The other main vertical passage 41 through the valve body 35 has an outlet 65 at its lower end in communication with the bottom distributor 18 in the treatment tank 11 through the mounting arrangement 25. A check valve 66 is seated in and seals the opposite end 67 of the passage 41. A valve seat 68 divides the passage 41 into an upper passage section 69 and a lower passage section 70, and the check valve 66 normally cooperates with the valve seat 68 to prevent communication from the upper passage section 69 to the lower passage section 70, while permitting fluid flow in the opposite direction from the lower passage section 70 to the upper passage section 69. The upper passage section 69 is in constant communication with the service line terminus 19, as will be seen, through the service (or bypass) water outlet port 71.

For reasons which will hereinafter be pointed out, a bypass around the valve seat 68 between the upper and lower passage sections 69 and 70 of the passage 41 is provided. This bypass includes the horizontal passage 75, the chamber 76, a vertical passage 77, a backwash actuator valve chamber 78, the valve stem passage 79, and a horizontal passage 80. Communication between the upper passage 69 and the lower passage section 70 through this bypass is normally closed off by the backwash actuator valve 81. In turn, the chamber 76 in the bypass is in communication with the brine tank conduit 26 through the port 85, while a brine inlet port 86 in the lower passage section 70 of the passage 41 is in communication with the brine delivery conduit 27.

Providing a mode of communication between the upper passage section 69 of the passage 41 and the upper passage section 48 of the passage 40 is a horizontal connecting passage 90. With the treatment apparatus 10 operating in normal service softening of water, however, as illustrated in solid lines in FIGURE 2, the two way valve 44 is effective to shut off communication between the upper passage sections 69 and 48 or, more properly, between the raw water inlet port 51 and the upper passage section 69 of the passage 41.

The two way valve 44 is a new and improved construction embodying features of the present invention, as has been pointed out. The two way valve 44 includes a sleeve 100 externally threaded at 101 below a positioning ledge 102. The sleeve 100 is threaded into the upper end 45 of the passage 40, as will be seen. An O-ring seat 105 in the valve body 35 around the open end 45 of the passage 40 seats an O-ring 106 which seals against the periphery of the sleeve 100 and the ledge 102.

A valve bore 110 extends through the entire length of the sleeve 100 and comprises a lower bore section 111 of a predetermined relatively small diameter, and an upper bore section 112 of a predetermined relatively larger diameter. The upper bore section 112 is, in turn, defined by an internal cylinder 113 which actually is formed within the confines of the upper end 114 of the sleeve 100.

A valve core 120 is slidable in the passage 110 between a lowermost position (dotted lines) wherein it seats on the valve seat 50 and seals off communication between the upper passage section 48 and the lower passage section 49 of the lower passage 40, and an uppermost position (solid lines) wherein it seals off communication between the upper passage section 48 and the lower bore section 111 of the sleeve 100. The valve core 120 includes a piston head 121 having a relatively small diameter lower head section 122 slidable in the bore section 111, and a relatively larger diameter upper head section 123 slidable in the relatively larger upper bore section 112. An O-ring 125 provides sealing between the upper head section 123 and the cylinder 113 while an O-ring 126 performs the same function between the lower head section 122 and the lower bore section 111.

The valve core 120 further includes a depending valve stem 130 threaded into the lower head section 122 of the piston head 121. A lower threaded end 131 of the stem 130 has a lower valve surface 132 threaded thereon for seating on the valve surface 50 in the passage 40, and an upper valve surface 133 loosely restrained on the stem 130 below a shoulder 134 for seating on a valve seat 135 surrounding the lower end of the passage 110 through the valve sleeve 100. Note that the valve surfaces 132 and 133 are formed of hard plastic bodies 138 with an overlying seating material 139 of rubber or the like formed thereon in a suitable manner.

The lower core section 111 in the sleeve 100 is in constant communication with the passage 90 extending transversely between the vertically extending valve body passages 40 and 41 through the medium of apertures 145 extending radially through the sleeve 100 adjacent the passage 90. Accordingly, it will be seen that when the valve surface 133 is moved away from the peripheral seat 135 on the lower end of the sleeve 100, the raw water inlet port 51 is in communication through the passage 90 with the upper passage section 69 of the passage 41 and, also, with the brine pressure outlet port 85 in the chamber 76 through the passage 75. In normal service operation of the valve assembly 15, however, the valve core 120 normally cuts off such communication, as illustrated in solid lines FIGURE 2.

Sealing the open upper end 150 of the bore 110 through the sleeve 100 in the valve assembly 44 is a removable plastic cap 151 having an O-ring seal 152 recessed in its periphery. A snap C-ring 153 normally seated in an angular recess 154 within the sleeve 100 serves to hold the cap 151 loosely against the upper edge of the cylinder 113 within the sleeve 100. With the snap C-ring 153 construction, it will be seen that the cap 151 can readily be removed to allow removal of the core 120 after the valve surfaces 132 and 133 are removed.

The area 160 above the upper head section 123 is normally in communication with the atmosphere through the space 161 surrounding the cylinder wall 113, the longitudinally extending passage 162 through the sleeve 100 (actually there might be several parallel passages 162), the annular recess 163 on the outside of the sleeve 100, the passage 164 through the valve body 35 to the valve stem passage 59 (the "drain chamber") and, thence, to the atmosphere through the drain port 55. Under such circumstances, of course, any fluid pressure greater than atmospheric pressure developed in the passage 40 of the valve body 35 acts on the bottom surface 170 of the piston head 121 and urges the core 120 into its uppermost position, as illustrated in solid lines FIGURE 2, sealing off communication between the raw water inlet port 51 and the passage 41 through the passage 90.

Free movement of the piston head 121 in the sleeve 100 is facilitated by venting the area 173 under the upper head section 123 of the piston head 121 to the atmosphere. This is accomplished through an axially extending depression 174 in the wall of the lower bore section 111 of the sleeve 100, and a radially extending passage 175 through the sleeve 100. The passage 175 communicates with the depression 174 above the O-ring 126 on the lower core section 122.

Only the details of the regeneration actuator valve 60, the check valve 66, and the backwash actuator valve 81 are yet to be described insofar as the actual structure of the valve assembly 15 is concerned. Insofar as the details of their construction form no specific part of the present invention, they are suitably described collateral to a description of the use and operation of the valve assembly 15.

By far the greater portion of the operating service life of the water treatment apparatus 10 in general, and the valve assembly 15 in particular, is spent merely directing the flow of raw service water through the particulate softening material 12 in the tank 11. This is referred to as normal service softening and, under such conditions, the valve assembly 15 is "normally" disposed, as illustrated in FIGURE 2. In other words, the regeneration actuator valve 60 is closed, the back wash actuator valve 81 is closed, and the valve core 120 of the two way valve assembly 44 embodying features of the present invention is held in its uppermost (solid line) position by inlet water pressure from the raw water inlet port 51 acting against the bottom surface 170 of the piston head 121.

Under these conditions, raw water entering the raw water inlet port 51 is directed down the lower passage section 49 in the passage 40 and out the top distributor 17 into the treatment tank 11. After passing through the particulate material 12 wherein the hardness producing ions in the raw water are substantially removed, the softened water departs the tank 11 through the bottom distributor 18 into the lower passage section 70 of the passage 41. This softened water, under service line pressure, forces its way past the check valve 66 and out the outlet port 71 to the service line terminus 19.

The check valve 66 is a simple arrangement, comprising a valve core 180 slidably seated in a cap 181 threaded into the open end 67 of the passage 41. An O-ring 182 encircling the cap 181 seals the cap against the body 35 of the valve assembly 15. A relatively weak coil spring 183 surrounds the stem 184 of the valve core 180 between the valve core head 190 and the valve cap 181, urging the head 190 downwardly against the valve seat 68. A rubber valve surface 191 on the head 190 provides a sealing surface with the valve seat 68.

Softened water which forces its way past the check valve 66 is also free to course through the passage 90 into the bore 111 underneath the piston head 121 of the valve core 120 of the two way valve assembly 44, of course. As such, it serves to assist in holding the valve core 120 in the position illustrated in solid lines in FIGURE 2.

At a predetermined time during a selected day, for example, regeneration of the particulate material 12 within the treatment tank 11 is initiated by the valve assembly 15 according to the present invention. The timing of such a regeneration cycle is the function of the timing device illustrated in the aforementioned co-pending application of Hiers entitled Water Conditioning System and begins with the opening of the regeneration actuator valve 60 by the timing device (not shown).

The regeneration actuator valve 60 comprises a valve diaphragm 195 mounted in the valve chamber 58 between a plastic valve cap 196 and the body 35 of the valve assembly 15. Note that the periphery 197 of the diaphragm 195 is retained between the body 35, and the cap 196 when the cap is threaded onto the body 35, as at 198. The diaphragm 195 has an annular valve surface 200 formed on its upper surface and adapted to seat against an annular valve seat 201 surrounding the valve stem passage 59. As long as the valve surface 200 and seat 201 are positioned tightly against each other, as illustrated in FIGURE 2, it will be seen that communication between the drain port 55 and the passage 40 is shut off.

The valve surface 200 is moved away from the valve seat 201 by pressing the valve stem 205 downwardly. As will be seen, the valve stem 205 comprises two stem sections 206 and 207 joined together with the diaphragm 195 therebetween. The upper end 210 of the valve stem 205 extends out of the valve body 35 past the O-ring seal 211 and into a position wherein it can be manipulated by the aforementioned timing device. When regeneration is initiated the timing device (not shown) forces the valve stem 205 downwardly causng the conically shaped lower valve stem 207 to move downwardly away from the diaphragm 195 and permit fluid under pressure which has leaked underneath the diaphragm 195 through the fine apertures 217 therein to escape to the chamber 59. Release of pressure below the diaphragm 195 allows the enlarged section 212 of the upper valve stem 206 to force the valve surface 200 away from the valve seat 201, via a metal plate 213, against the bias of a coil spring 214 seated in a well 215 in the cap 196 and bearing against the lower end 216 of the lower valve stem 207. Immediately, raw water entering the raw inlet port 51 passes the valve surface 200 and seat 201 to the drain port 55.

As has been pointed out, the drain port 55 is purposely restricted slightly and, accordingly, a slight build-up of pressure in the valve stem passage or "drain chamber" 59 is effected. Water under pressure is thus forced up the passage 164, the passage 162 in the valve sleeve 100 of the two way valve assembly 44, and the annular passage 161 surrounding the cylinder 113 within the sleeve 100, to the space 160 above the piston head 123. Since the effective surface area of the top 220 of the piston head 123 is substantially larger than the effective surface area of the bottom 170 of the head, the valve core 120 is immediately rammed downwardly to the position illustrated in dotted lines in FIGURE 2. The valve surface 132 on the valve stem 130 of the two way valve assembly 44 seats on the valve seat 50 within the passage 40 and, immediately seals off communication between the raw water inlet port 51 and the lower passage section 49 of the passage 40.

Immediately upon the valve core 120 moving to its second position in the aforementioned manner, raw water begins to pass through the passage 90 into the upper passage section 69 of the passage 41 containing the service (or bypass) water outlet port 71. Since the check valve 66 will not permit passage of water past the valve seat 68 from the upper section 69 to the bottom passage section 70, water is directed out of the outlet port 71 and, in effect, raw water is sent to the residence through the service line terminus 19.

The water under pressure entering the inlet port 51 now concurrently serves to hold the valve core 120 in the position illustrated in dotted lines in FIGURE 2, since the effective horizontal surface area of the valve seats 132 and 133 is greater than the area 170 on the lower end of the piston head 121. The water entering the passage section 48 from the inlet port 51 is under greater pressure than that returning to the lower passage section 49 from the tank 11, of course, because the passage section 49 is vented to the atmosphere through the drain port 55.

At the same time, raw water under pressure courses down the passage 75 and is forced out of the brine outlet port 85, since the backwash actuator valve 81 is still closed. Raw water proceeds from the brine outlet port 85 through the brine conduit 26 and the brine tank 30, in the manner described in the aforementioned Kryzer application. Brine returns under pressure through the brine conduit 27 to the brine inlet port 86 in the lower passage section 70 of the passage 41. The brine is directed out of the bottom distributor 18 within the treatment tank 11 and passes through the particulate material 12 to remove hardness inducing ions. The brine subsequently departs the treatment tank 11 through the top distributor 17, the lower passage, section 49 of the passage 40, the transverse passage 56, the port 57, the regeneration actuator valve chamber 58, and the valce stem passage 59 to the drain port 55.

After a predetermined regeneration period, which might include a period of fresh raw water rinse when the brine tank 30 has been depleted of its source of brine, the aforementioned timing device (not shown) is effective to open the backwash actuator valve 81 while retaining the regeneration actuator valve 60 in open position. The backwash actuator valve 81 is identical in construction to the regeneration actuator valve 60 hereinbefore discussed and, accordingly, corresponding parts of the backwash actuator valve 81 are identified by corresponding reference numerals plus the suffix (a) to facilitate differentiation between the components of the valves 60 and 81. Thus, depressing the valve stem 205a moves the valve surface 200a away from the valve seat 201a surrounding the valve stem chamber 79.

Opening the back wash valve 81 in the foregoing manner permits raw water which had been directed out of the brine outlet orifice 85 to bypass the orifice 85, passing through the passage 77, the backwash actuator valve chamber 78, the valve stem passage 79, and the passage 80, into the lower passage section 70 of the passage 41. This raw water enters the treatment tank 11 through the lower distributor 18 and removes residual brine and/or foreign materials before departing the treatment tank 11 through the upper distributor 17. The impurity laden raw water passes out of the valve assembly 15 from the lower passage section 49 of the passage 40 through the passage 56, the port 57, the regeneration actuator valve chamber 58, the valve stem passage 59, and the drain port 55. During this time, of course, the same differential pressure relationship is maintaining the valve core 120 of the two way valve 44, in its second position, as illustrated in dotted lines in FIGURE 2.

After the predetermined backwash period, the timing device (not shown) releases the valve stem 205 permitting the coil spring 214 to close the valve 60. There is an immediate pressure build up in the valve assembly 15 generally, and in particular in the lower passage section 49 of the passage 40. A pressure balance develops on opposite sides of the valve seat 132 and, accordingly, service line pressure of raw water entering the raw water inlet port 51 acting on the lower surface 170 of the piston head 121 moves the core 120 into the position shown in solid lines in FIGURE 2, the first position of the valve assembly 44. Thus, communication between the raw water inlet port 51 and the outlet port 71 in the passage 41 through the passage 90 is immediately severed, while the raw water inlet port 51 is put in communication wtih the lower passage section 49 of the passage 40, and accordingly, the top distributor 17. Raw water again begins coursing through the water treatment tank 11 in normal service softening. Shortly hereafter, and before the next regeneration cycle, the timing device permits the valve 81 to close.

As has been pointed out, the valve assembly 15 is securely mounted on the water treatment tank 11, by the mounting arrangement 25 for quick and simple removal and replacement when necessary. As a result, the valve assembly 15 (and timing device) can readily be removed and replaced with a minimum of labor. This simplifies and lowers the cost of maintenance considerably.

The mounting arrangement 25 includes an externally threaded adaptor collar 220 which is threadedly received in a suitably dimensioned aperture 221 in the top of the treatment tank 11. The adaptor 220 is threaded tightly into the aperture 221, as at 222 and, accordingly, is not ordinarily removable under operating conditions. An O-ring 223 seals the adaptor collar 220 in the aperture 221.

First and second passages 225 and 226 extend through the adaptor collar 220, as illustrated, and are connected to the top tank distributor 17 and the bottom tank distributor 18, respectively. In this light, the distributors 17 and 18 might be threadedly received in corresponding passages 225 and 226 in a well known manner, or they might be seated in an interference fit, for example.

The adaptor collar 220 has a pair of annular coupling wells 230 formed in the upper ends of the passages 225 and 226. The valve assembly 15 is adapted to seat in the coupling wells 230 with the passage 40 in communication with top distributor 17, and the passage 41 in communication with the bottom distributor 18. To this end, the "leg" 232 of the valve body 35, which contains the greater portion of the lower passage sections 49 and 70 of the passages 40 and 41, respectively, has an identical pair of generally cylindrical valve seats 233 formed on its lower extremity. These cylindrical valve seats extend around the open lower ends 43 and 65 of the passages 40 and 41, respectively, and have sealing O-rings encircling them in seated relationship to recesses 235. The valve seats 233 are dimensioned to fit precisely within the coupling wells 230, as illustrated best in FIGURE 2.

With the cylindrical valve seats 233 seated in the coupling wells 230 in complementary relationship, identical sets 240 of wings 241–244 formed on the opposite side of the valve body leg 232, mesh with corresponding sets 250 of ears 251–254 formed on opposite sides of the adapter collar 220. The wings 241–244 include the two outermost wings 241 and 244 which have flat, lowermost surfaces 260 thereon for seating on the correspondingly flat upper surface 261 of the adapter collar 220 and providing a wide mounting base for the valve assembly 15 and its timer assembly (not shown). The two innermost wings 242 and 243 of each set 240 are somewhat shorter than the wings 241 and 244 and, accordingly, do not engage the surface 261 of the adapter collar 220.

The distal ends 262 of the wings 241–244 have axially aligned passages 263 extending therethrough. With the valve assembly 15 seated properly on the adapter collar 220, the passages 263 are aligned with similar passages 264 formed in the ears 251–254 extending upwardly from the adapter collar 220. A pair of locking pins 270 extend through each of the aligned series of passages 263, 264 when the valve assembly 15 is properly seated on the mounting collar 220 and firmly lock the valve assembly 15 in place. C-clips 271 seated in annular recesses 272 formed around opposite ends of the pins 270 prevent inadvertent removal of the pins, while permitting easy withdrawal thereof if one of the clips 271 is sprung off.

From the foregoing description, it will be recognized that a valve assembly 15 has been described wherein differential fluid pressures are effective to operate a new and improved two-way valve. To assure positive action of the two way valve, with a concomitant elimination of faulty valve operatoin and "hammering noises" for example, the two way valve is positively seated in one position by a pressure boost relationship, according to the present invention. The valve assembly mounting arrangement 25 affords quick and simple mounting, removal, and replacement of the valve assembly 15 from the top of the water softener tank 11. During operation of the water treatment apparatus 10, of course, the valve assembly 15 is securely seated. It is but a simple matter, however, to remove and replace an entire valve assembly 15 if necessary.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A valve assembly for controlling a plurality of treatment operations in liquid treatment apparatus including a treatment tank, comprising; a valve body, first passage means in said valve body in communication with the tank, a raw liquid inlet port to said first passage means, second passage means in said body connecting said first passage means with a drain chamber having a drain outlet port to atmospheric pressure, an actuator valve in said second passage means normally closing said second passage means, a valve seat in said first passage means between said inlet port and said second passage means, a valve core in said first passage means slidable between a normal operating position removed from said valve seat and an alternate position seated against said valve seat and sealing off direct communication between said inlet port and said second passage means, a booster chamber in said first passage means opposite said core from said valve seat, and third passage means in said valve body connecting said drain chamber with said booster chamber, the opening of said actuator valve permitting liquid to reach said drain chamber from said first passage means, said drain port having a restricted opening to the atmosphere so that a portion of the fluid entering said drain chamber is directed to said booster chamber through said third passage means whereby said valve core is moved positively from its normal operating position to its alternate position and seated against said valve seat.

2. A valve assembly for controlling a plurality of treatment operations in liquid treatment apparatus including a treatment tank, comprising: a valve body, first passage means in said valve body in communication with the tank, a raw liquid inlet port to said first passage means, second passage means in said body connecting said first passage means with a drain chamber having a drain outlet port therefrom, an actuator valve in said second passage means normally closing said second passage means, a valve seat in said first passage means between said inlet port and said second passage means, a valve core in said first passage means slidable between a normal operating position removed from said valve seat and an alternate position seated against said valve seat and sealing off direct communication between said inlet port and said second passage means, a booster chamber in said first passage means opposite said core from said valve seat, and third passage means in said valve body connecting said drain chamber with said booster chamber, the opening of said actuator valve permitting liquid to reach said drain chamber from said first passage means, fluid from said drain chamber being directed to said booster chamber through said third passage means whereby said valve core is moved positively from its normal operating position to its alternate position and seated against said valve seat, said valve core having a first pressure responsive area facing said booster chamber and a second pressure responsive area facing said inlet port, said first pressure responsive area being larger than said second pressure responsive area, fluid pressure in said first passage means being effective on said second pressure responsive area to hold said valve core in said normal operating position during normal service operation of said valve assembly, the opening of said actuator valve to pressurize said booster chamber being effective to bring pressure to bear on said first pressure responsive area to move said valve core to said alternate position.

3. The valve assembly of claim 2 further characterized in that said valve core has a third pressure responsive area facing said inlet port, said third pressure responsive area being larger than said second pressure responsive area, fluid pressure in said first passage means being effective on said third pressure responsive area to hold said valve core in alternate position after it has moved thereto under the booster influence of pressure in said booster chamber.

4. A valve assembly for controlling a plurality of treatment operations in liquid treatment apparatus including a treatment tank, comprising; a valve body, first passage means in said valve body in communication with the tank, a raw liquid inlet port to said first passage means, second passage means in said body connecting said first passage means with a drain chamber having a drain outlet port to atmospheric pressure an actuator valve in said second passage means normally closing said second passage means, a valve seat in said first passage means between said inlet port and said second passage means, a two way valve in said first passage means opposite said valve seat from the tank, said two way valve comprising a sleeve removably seated in said passage means, and a valve core slidable in said sleeve between a normal operating position removed from said valve seat and an alternate position seated against said valve seat and sealing off direct communication between said inlet port and said second passage means, a booster chamber in said sleeve opposite said valve core from said valve seat, and third passage means in said valve body connecting said drain chamber with said booster chamber in said sleeve, the opening of said actuator valve permitting liquid to reach said drain chamber from said first passage means, said drain port having a restricted opening to the atmosphere so that a portion of the fluid entering said drain chamber is from said drain chamber being directed to said booster chamber through said third passage means whereby said valve core is moved positively from its normal operating position to its alternate position and seated against said valve seat.

5. The valve assembly of claim 4 further characterized by and including a raw water outlet port from said first passage means, another valve seat in said first passage means between said raw water inlet port and said raw water outlet port, said valve core being seated against said other valve seat in its normal operating position to shut off direct communication between said raw liquid inlet port and said raw water outlet port.

6. The valve assembly of claim 5 further characterized in that said other valve seat is defined by an annular surface on the lower end of said valve sleeve, said sleeve having radially extending aperture means therein in communication with said raw water outlet port.

7. The valve assembly of claim 4 further characterized in that said valve core includes a first core section of predetermined relatively large diameter, and a second core section of predetermined relatively lesser diameter, said first core section having a pressure responsive area facing said booster chamber and said second core section having a pressure responsive area facing said inlet port, said first pressure responsive area being larger than said second responsive area, fluid pressure in said first passage means being effective on said second pressure responsive area to hold said valve core in said normal operating position during normal service operation of said valve assembly, the opening of said actuator valve to pressurize said booster chamber causing pressure to be effective on said first pressure responsive area to move said valve core to said alternate position.

8. The valve assembly of claim 7 further characterized in that said valve core further includes a valve stem extending from said second core section and carrying disc valve seat means, said disc valve seat means having a third pressure responsive area formed thereon facing said inlet port, said third pressure responsive area being larger than said second pressure responsive area, fluid pressure in said first passage means being effective on said third pressure responsive area to hold said valve core in said alternate position after it has moved thereto under the booster influence of pressure in said booster chamber.

References Cited
UNITED STATES PATENTS

| | | | |
|---|---|---|---|
| 1,520,183 | 12/1924 | Hamer | 220—55 |
| 1,835,418 | 12/1931 | McHardy | 220—55 |
| 2,596,354 | 5/1952 | Zollinger | 220—55 X |
| 2,661,861 | 12/1953 | Oldenburg | 220—55 X |
| 2,670,328 | 2/1954 | Webb | 210—140 |
| 2,999,514 | 9/1961 | Kryer | 210—191 X |
| 3,181,564 | 5/1965 | Rudelich | 210—190 X |
| 3,208,476 | 9/1965 | Clack | 210—190 X |

SAMIH N. ZAHARNA, *Primary Examiner.*

REUBEN FRIEDMAN, *Examiner.*

C. M. DITLOW, *Assistant Examiner.*

UNITED STATES PATENT OFFICE
CERTIFICATE OF CORRECTION

Patent No. 3,335,752                              August 15, 1967

James E. Hiers et al.

It is hereby certified that error appears in the above numbered patent requiring correction and that the said Letters Patent should read as corrected below.

Column 4, lines 34 and 35, for "angular" read -- annular --; column 5, line 71, for "causng" read -- causing --; column 6, line 63, for "valce" read -- valve --; column 8, line 37, for "operatoin" read -- operation --; column 10, line 63, for "Kryer" read -- Kryzer --.

Signed and sealed this 24th day of September 1968.

(SEAL)
Attest:

Edward M. Fletcher, Jr.                          EDWARD J. BRENNER
Attesting Officer                                   Commissioner of Patents